Nov. 20, 1928.  
N. C. DAVIS  
1,691,921  
STRANDED SECTOR SHAPED CONDUCTOR  
Filed April 20, 1927  5 Sheets-Sheet 1
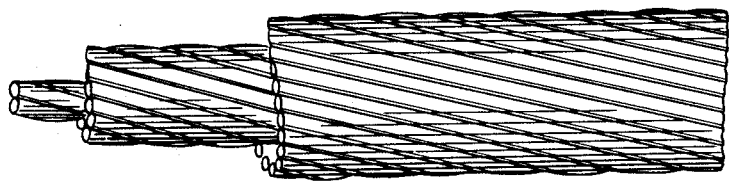
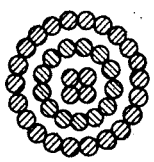
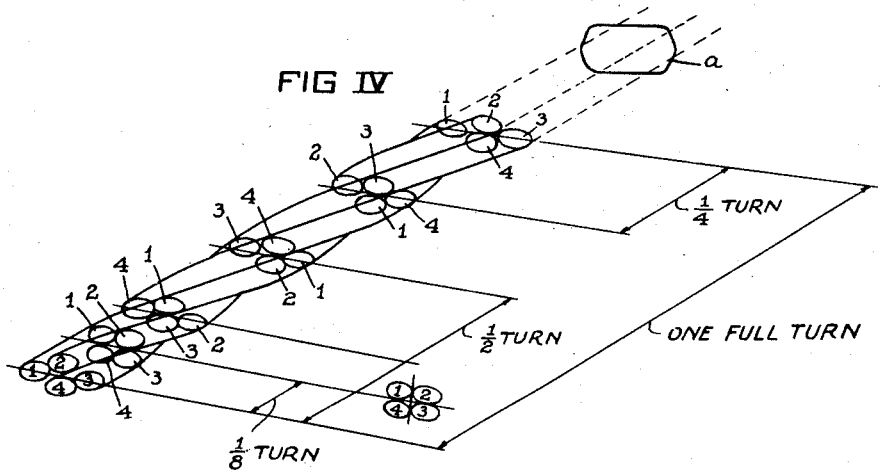
INVENTOR FIG V
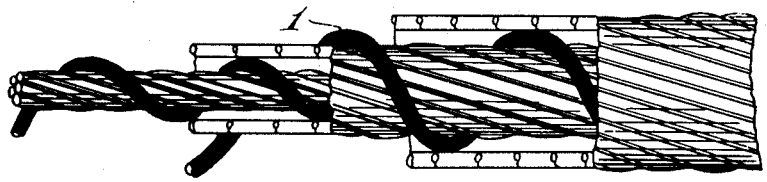
FIG VI 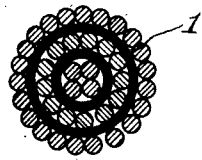
FIG VII 
FIG VIII 
FIG IX
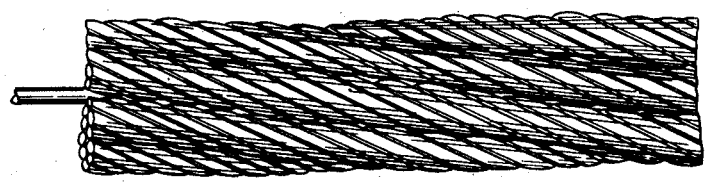
FIG X 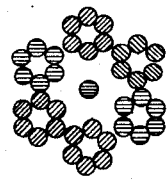
FIG XI 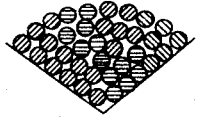
FIG XII 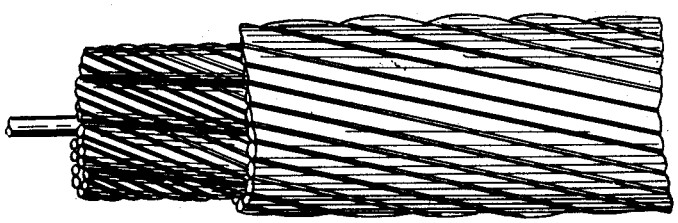
FIG XIII 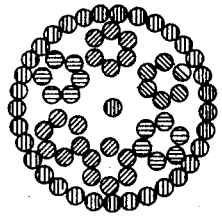
FIG XIV
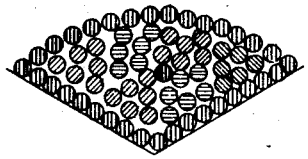

Nov. 20, 1928. 1,691,921
N. C. DAVIS
STRANDED SECTOR SHAPED CONDUCTOR
Filed April 20, 1927  5 Sheets-Sheet 3
FIG XV 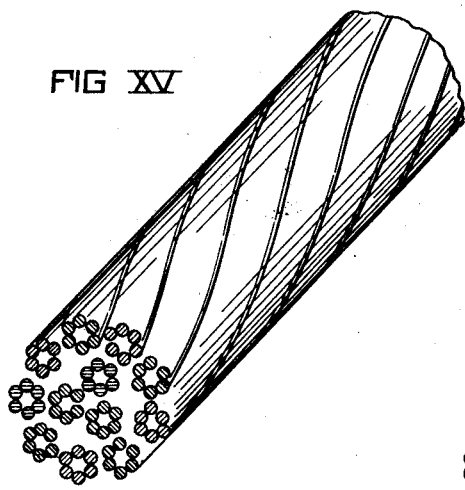
FIG XVI 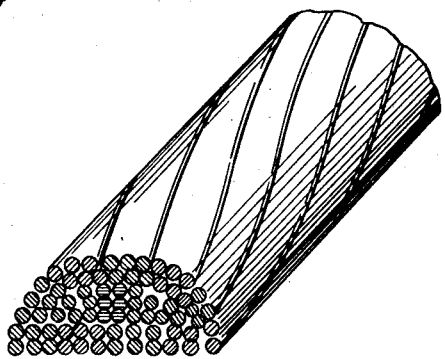
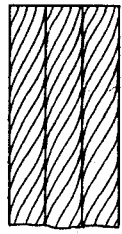
FIG XVII  FIG XVIII
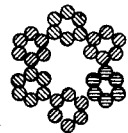 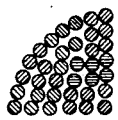
FIG XIX  FIG XX
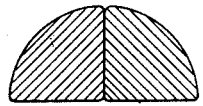
INVENTOR
Norman C. Davis
by Christy and Christy
his attorneys Nov. 20, 1928.
N. C. DAVIS
1,691,921
STRANDED SECTOR SHAPED CONDUCTOR
Filed April 20, 1927   5 Sheets-Sheet 4
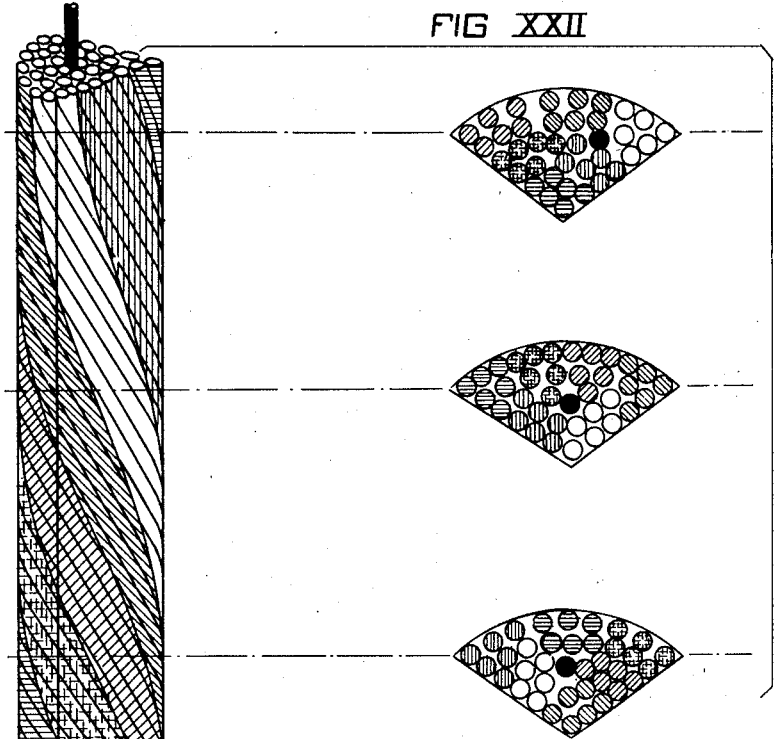
FIG XXII
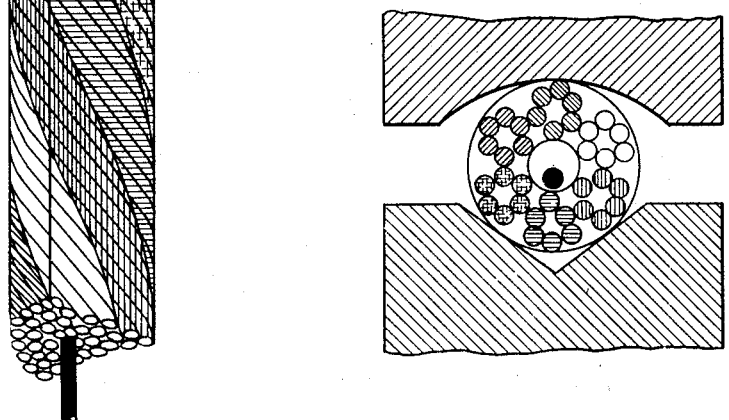
FIG XXI
INVENTOR
Norman C. Davis
by Christy and Christy
his attorneys Nov. 20, 1928.
N. C. DAVIS
1,691,921
STRANDED SECTOR SHAPED CONDUCTOR
Filed April 20, 1927   5 Sheets-Sheet 5
FIG XXIII
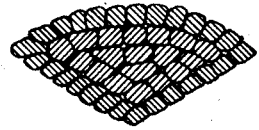
FIG XXIV
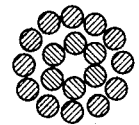
FIG XXV
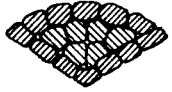
FIG XXVI
FIG XXVII
INVENTOR
Norman C. Davis
by Christy and Christy
his attorneys Patented Nov. 20, 1928.

1,691,921

UNITED STATES PATENT OFFICE.

NORMAN C. DAVIS, OF PERTH AMBOY, NEW JERSEY, ASSIGNOR, BY MESNE ASSIGNMENTS, TO GENERAL CABLE CORPORATION, A CORPORATION OF NEW JERSEY.

STRANDED SECTOR-SHAPED CONDUCTOR.

Substitute for application Serial No. 402,832, filed August 11, 1920. This application filed April 20, 1927. Serial No. 185,096.

This application is a substitute for an application for Letters Patent filed August 11, 1920, Serial No. 402,832, and is in part a continuation of applications filed September 23, 1921, Serial No. 502,628, and October 25, 1924, Serial No. 745,883.

My invention relates to the making of sector-shaped conductors for multiple-conductor cables, and consists both in method and in product.

It is advantageous, in the making of multiple-conductor cables, particularly those of large size, that the conductors be composed, each of a number of smaller wires, stranded together in helical twist. A cable whose conductors are so composed is flexible in far greater degree than a cable whose conductors consist, each of a single solid wire.

In the making of sector-shaped conductors (a shape advantageous, in that a cable of given circular mileage or cross section may be made of relatively small over-all dimensions) the formation of the individual conductor out of an assembly of small wires presents peculiar difficulties. If the sector shape be attained by a particular grouping of the wires, then stranding (that is to say, helical winding of the wires about one another or about a common axis) becomes impossible. The shape-giving wires must extend straight away through the length of the conductor. Manifestly a conductor so composed, with wires extending straight away throughout its length, is far less flexible, whether under cross-bending or under torsion, than a compound conductor whose constituent wires are stranded or spiraled in a helix. Furthermore, a compound conductor whose body is built up of wires extending straight away throughout its length will, when bent or twisted, tend to lose its characteristic and important sector shape; its component wires will tend to become displaced; the conductor as a whole will tend to assume circular cross-sectional form—this in far greater degree than if the constituent wires were stranded or spiraled.

If the compound sector be built up by binding a core bundle about with one or more layers of stranded (that is to say, helically wrapped) wires, the core bundle itself being made up of parallel straight-away wires of equal or of diverse diameters, grouped to sector shape in cross section, or otherwise made up, then, in consequence of the rounding of the angles incident to the wrapping on of the enveloping layer or layers, the sector shape of the enveloped core is seriously compromised, and the advantages sought are measurably unattained. This rounding of the corners increases directly with the number of binding layers applied.

If the sector shape be attained by rolling to sector-shape a conductor composed of a plurality of wires initially stranded helically in usual manner to substantially circular compact section, then the strains of crushing, coming as necessarily they do unequally at successive points upon the individual wires, produce deformation, and irregular deformation of the individual wires. The same wire is at different points in its extent differently misshapen and in many cases almost cut through. One notable result of this rolling is that, electrically considered, the effective cross-sectional area of the conductor is greatly diminished. Therefore, the current-carrying capacity of the conductor as a whole is greatly diminished—making it necessary to allow an excessive additional area of metal before rolling, to give the necessary required effective area after the rolling operation. The economies incident to the sector shape are then partially or wholly lost in countervailing diminution of capacity.

Indeed, the difficulties here indicated are such that hitherto it has been impossible to produce a good sector-shaped conductor of well-defined sector shape, composed of a bundle of wires of uniform cross-section and helically arranged,—a formation which, were it attained, would be of greatest value, because in it would be brought together many desirable features such as the following: well-defined sector shape, economy of space, maximum flexibility, and ability to be cabled with other conductors to a reasonably short cabling lay.

My invention consists in stranding the wires of the conductor (that is to say, bringing them together in a bundle in which the wires are helically twisted), the bundle itself being round, or approximately so. I shall hereafter throughout this specification use the phrase "helically stranded" to designate the grouping of the wires in the manner indicated, and, in the drawings about to be described, clearly shown. The proportions of this bundle are such—the arrangement of the component wires into a bundle is such, that the bundle itself may in an ensuing operation be crushed to sector shape, and that without appreciably mutilating or misshaping at successive points the wires of which the bundle is composed. The resulting stranded conductor will be a stable entity, which will have a well-defined sector shape, which will have suffered little or no loss of effective conductivity incident to manufacture, and which will be free of localized hardening and deformation of its constituent wires. Also, the sector will have maximum flexibility both in torsion and in bending, and there will be little or no tendency of the sector to assume a rounded form when under torsion or bending. All this is accomplished without the employment of a core of straight-away wires or bars, to give the desired characteristic sector shape.

In the accompanying drawings Fig. I shows in side elevation and diagrammatically a collocation of wires helically stranded, according to my invention, into a bundle, the bundle being adapted to be crushed, according to my invention, from circular cross-sectional shape to sector shape. Fig. II shows this same collocation in cross-section. Fig. III shows the bundle after the crushing operation has been performed upon it. Fig. IV is a diagrammatic view in perspective, showing the innermost portion of the bundle, and the arrangement of the innermost wires, after the crushing operation has been performed upon the bundle.

Figs. V-VIII illustrate a permissible modification in the practice of the invention.

Figs. IX-XI illustrate a variation in the formation of the bundle.

Figs. XII-XX illustrate further variations.

Figs. XXI and XXII show diagrammatically and in minute detail, how the invention may be practiced, and trace the arrangement of the individual wires, from their positions in the assembled blank to their positions in the finished article. The particular conductor chosen for more elaborate illustration in Figs. XXI and XXII is that of Figs. IX-XI, but it will be understood that what is here illustrated respecting one particular conductor is true of all conductors built according to my invention.

Fig. XXIII is a view corresponding to Fig. III and illustrates my invention, in a specific elaboration of it to be described below.

Figs. XXIV and XXV, XXVI and XXVII are pairs of correlated diagrams, illustrating in further detail that specific elaboration last alluded to.

The invention consists essentially in stranding helically a number of wires to a bundle of hollow formation, preferably circular in cross-section, or substantially so, and then bringing the bundle to sector shape at the expense of the hollow space or spaces within the bundle; and this without mutilation of the component wires. In the bundle each wire is free of the others and in the shaping of the bundle the wires by virtue of such freedom may move, and do move, both laterally and longitudinally, and independently, to new relative arrangement, and there is no localized mutilation, no appreciable irregular diminution in cross-sectional area at successive points in the length of a component wire.

The area of a circle is greater than the area of a sector of equal periphery. If then a substantially or approximately circular bundle of tangent wires be formed with a hollow space within, and if such a bundle after being formed be brought to the cross-sectional shape of a sector of equal perimeter, the cross-sectional area of the bundle will be diminished. This diminution of area may be brought about wholly at the expense of the hollow space, and without appreciable mutilation of the individual wires irregularly at successive points in their length. My invention takes advantage of and realizes this possibility.

The simplest working out of the invention is attained in forming initially a hollow bundle of helically stranded wires. This simplest form is illustrated, with slight elaboration, in Figs. I-IV of the drawings. The bundle here consists of three successively enveloping layers of helically stranded wires (the number of layers is immaterial to the invention). The component wires of each layer are shown to be, and ordinarily will preferably be, tangent, or substantially so, wire to wire. There is a hollow space within the innermost layer, and there are hollow spaces between the layers. Figs. I and II show the bundle when first assembled; Fig. III shows it when brought thereafter to sector shape. It will be observed, on comparing Figs. II and III that the hollow spaces initially present are ultimately eliminated. The bundle is in its initial stage (Fig. II) properly proportioned; each successive layer of wires is such in its extent, in the number of wires composing it, as to afford an inner space of proper size, so that when the sector shape is imposed upon the bundle the spaces will be diminished and preferably eliminated, the component wires will rearrange themselves and the component wires will closely overlie one another and the whole will become integrated in a unitary conductor, but without substantial mutilation of the component wires.

The central "layer" of the bundle of Figs. I-III consists of four wires. Four is the smallest number of wires which, stranded symmetrically about a common axis and tangent wire to wire, will form a bundle capable of consolidation according to my invention.

The effect upon this innermost group of four wires of the crushing of the whole bundle is diagrammatically indicated in Fig. IV. It will there be seen that, whereas in the initial assembly (Fig. II) this group when measured in vertical direction must at successive points be of varying depth, it will in the ultimate assembly be of substantially unvarying depth throughout (a depth twice the diameter of the individual wires). In Fig. IV the polygonal figure a with rounded corners, represents the limits of the space occupied by this central group of wires throughout its whole extent.

Manifestly the number of wires composing this central group might be greater than four, and still be responsive to that change in relative position wherein my invention resides. On the other hand, the achievement of the invention may be left to spaces enclosed by surrounding layers, and this central group may be made up of a number smaller than four; indeed, a single wire may stand at the center of the bundle. But, as has been said, if the practice of the invention is to involve a change in the relative positions of the component wires of this innermost group, then the number of component wires should be four or more. It is common in the industry for a user of cables to specify the number of wires of which the stranded conductors are to be composed; and, in view of what I have just said, it is manifest that the maker, practicing my invention, and following the requirements of the specification laid before him, may arrange at the center of the bundle a single wire or a group of two, three, or more wires, as need may be.

If the central group, or if the single group of the blank in simplest form, consists of four wires or more, it will be perceived that in the finished article each component wire will extend in winding course throughout its length. And in any case, all the wires with the possible exception of a single central wire will extend in winding courses. This is a condition which has not hitherto been attained, at least not without excessive irregular mutilation of the component wires and consequent excessive impairment of the conductivity of the conductor as a whole; and it is a condition which, being attained, affords a finished conductor which is flexible in highest degree.

Another characteristic of the stranded, sector-shaped conductor of my invention is that it is susceptible to being twisted on its longitudinal axis without loss of its essential sector shape. This is a characteristic which has not hitherto been attained; hitherto it has been necessary, in making into a cable helically stranded sector-shaped conductors such as the art hitherto has known, to assemble the component conductors in a very long "lay"; that is to say, with a very gradual twist or turning about the cable axis—a very much longer lay than otherwise would be employed. This limitation has been imposed by the circumstance that, if a shorter lay were attempted, the strains set up within the individual conductor would cause the component wires to shift in position, and the conductor as a whole to lose its essential sector shape. In the practice of my invention, the otherwise normal operation of cable making is not disturbed. The component conductors may be united with the desired relatively short lay, and that without loss of the essential sector shape of the component conductors. The result is a completed cable which is flexible in highest degree, in contrast with the relatively stiff structure which alone hitherto has been attainable.

In building up the bundle diagrammatically shown in Fig. II mandrels may be employed, removable as building progresses, upon which mandrels the successive layers may be helically stranded. The mandrels for the outer layers will of course be hollow. The crushing of the bundle, from the circular shape of Fig. II with included spaces, to the sector shape of Fig. III with spaces eliminated, may be effected in any way known to the art, with the qualification, that the component wires shall be free to move longitudinally as well as laterally, one relatively to another. The crushing ordinarily will be effected between rolls, one or both of the rolls being power-driven, and the bundle of wires advancing in response to the tractive effect of the rolls upon it. In Fig. XXI an assembled and uncrushed blank is shown in vertical section, and above and below appear in vertical section the bodies of two rolls (separated for the purpose of this diagrammatic showing as in practice they would not be, at least not while the crushing operation is in progress). The grooves in the faces of these rolls are such that, when the rolls come into cooperative relative positions and when a blank such as that of Fig. II is rolled between them, it will be crushed to the form shown in Fig. III. While the bundle is being crushed the component wires are free to move one relatively to another longitudinally as well as laterally as they assume their new relative positions.

In Figs. I and II the successive layers are shown standing in concentric arrangement, with no visible means of support. This concentricity will be substantially maintained, if the blank passes directly from the forming mandrels to the crushing rolls, with no extended space between. But it will be understood that Figs. I and II may in this particular be taken to be diagrammatic. There can be no harm, nor disturbance of the described operation, if at the time when the blank enters the crushing rolls the assembled layers do not stand concentrically, but instead rest one upon another at the lowermost points of their peripheries. (Compare, on this point, the position of the central wire as shown in Fig. XXI.)

Instead of building up the successive layers with the aid of mandrels, an alternative expedient is illustrated in Figs. V–VIII, and by resort to this expedient true concentricity of the components of the blank may under all conditions be assured. Here upon each underlying group of layer is applied a serving 1 of suitable material, for example soft wire. This serving will constitute a support upon which the next layer may be laid down, and it will sustain the superposed layer at proper spaced interval from the underlying body. In the ensuing crushing operation the serving 1 will be crushed, and the material of which it is composed will be squeezed and distributed in the interstices between the wires of the crushed bundle. If the component wires of the bundle be of copper, as ordinarily they will be, then the serving 1 may be of lead wire. Lead will in the crushing operation flow and distribute itself between the copper wires, without effecting any distortion or mutilation of them. As an ultimate step in the forming of the conductor, the lead may be removed, if its removal be desired, from between the copper wires, by melting it out, or by chemical action. Conceivably the serving might be of a readily combustible material, and be burned out. Figs. VI, VII and VIII clearly illustrate the successive steps described.

Figs. IX–XI illustrate another collocation of wires in the initial bundle, my essential invention being still present. I have said that the invention in simplest form is practiced in forming a hollow helically stranded bundle of substantially circular cross-section, and then crushing the bundle to sector form at the expense of the hollow space, and with relative rearrangement of the component wires. Here in Figs. IX–XII six helically stranded tubular bundles (each, in this instance, consisting of six wires) are in their turn helically stranded into a hollow compound bundle. At the center is a single wire; instead this single wire might be left out or there might manifestly be at the center a seventh hollow stranded bundle or a group of single wires. In crushing to sector shape, the hollow spaces (both those within the several component tubular bundles and that formed by and between the tubular bundles when brought together) are taken up, and the resultant sector (Fig. XI) is made up of unmutilated wires lying in close allocation.

It is apparent that the compound bundle of Fig. X may be made up of any desired number of simple tubular bundles, and of successive layers of them. Figs. XII–XIV illustrate a combination of the principles of formation separately illustrated in Figs. II and X. Here the successive layers consist, one (the outermost) of single wires helically stranded about the main axis, and another (the intermediate layer) of tubular bundles, the component wires of each simple tubular bundle being helically stranded about its own axis, and the assembled tubular bundles composing the layer being helically stranded about the main axis of the whole. At the center is a single wire.

Figs. XV and XVI give a further idea how my invention may be practiced in the formation of a sector-shaped conductor. The angular value in this case is shown as 180°. In this case three helically stranded tubular bundles such as have already been described are laid straight away at the center of the compound bundle, and around these is helically stranded a plurality of other like helically stranded bundles. The components may be means of corresponding shading be followed from their initial position in Fig. XV to their ultimate position in Fig. XVI. No further description is required to make plain the working out of my invention in this particular instance.

Another way of attaining substantially the same end as that last described, and still with the advantages which my invention affords, is indicated in Figs. XVII–XX. Fig. XVII indicates the initial grouping of six helically stranded tubular bundles (of which there are two for the ultimate 180° sector); Fig. XVIII shows the initial group after being reduced by rolling to quadrant shape; Fig. XIX shows two complementary rolled quadrants, brought together; and Fig. XX shows the sector completed by a layer of wire helically stranded upon the quadrants when brought together.

Variations may be multiplied, and further elaboration is unnecessary.

It has been impossible hitherto, to produce a sector-shaped conductor composed of many wires in which substantially all of the component wires are helically stranded, and in which the component wires are not by the crushing operation mutilated irregularly at successive points in their length.

In Figs. XXI and XXII, I have, by means of a variety of shading, traced the component wires, from their positions in the blank to their positions in the compressed sector. I have selected the blank of Fig. IX for this purpose, but the selection is purely arbitrary; I might have selected a blank of another grouping. Fig. XXI shows the initial grouping, and the scheme of variant shading is carried forward from Fig. XXI to Fig. XXII. Fig. XXII shows the crushed sector in perspective, and, at the successive points indicated, in cross-section. With these comments the showing will be understood, and will carry its own explanation, without further comment.

Turning now from the details of the several figures of drawing thus far considered to general observations, it is to be remarked that the angular value of the sector produced will be such as may be desired. The conductors shown in most of the figures of the drawings are intended for use in three-conductor cables, and the angular value of these sectors is 120°. If the conductor were intended for a four-conductor cable, the angular value would be 90°; if it were intended for a two-conductor cable, the angular value would be 180°. Such adaptations will be understood to be included in the contemplation of my invention and in the field of my patent.

It will be understood that a helically stranded sector-shaped conductor made as herein described may if desired be built upon and enlarged by superposing additional layer or layers upon it. Such superposed layer may be of plain wires and the so completed conductor may or may not be crushed again after the super-position. It will likewise be understood that a helically stranded sector-shaped conductor, made as herein described, can be laid side by side with other similar or unlike shapes to form a compound conductor, and also that such compound conductor can be built upon and enlarged by superimposing additional layer or layers upon it. This appears in Figs. XVII–XX, and has already been described. I have in an earlier paragraph of this specification spoken of the disadvantageous rounding of corners, consequent upon the building out in such manner of a sector-shaped conductor. Nevertheless, the disadvantage being recognized, the practice may be resorted to, where particular requirements justify.

The conductor built according to the foregoing description is assembled with other conductors and built into the finished cable. This will be done by the usual familiar operations, or their equivalents. It will be found that in the practice of my invention sector cables may be produced having large capacity, small dimensions, and flexibility, united in higher degree than hitherto has been attained.

A specific elaboration of my invention is illustrated in Figs. XXIII–XXVII. I may for certain uses advantageously carry the crushing step further, and may not merely eliminate the tubular space of the initial blank (leaving a finished product in which the wires touch one another throughout the cross-section of the finished article), but I may, by carrying the crushing step further, shape the wires one to another, changing them from circular cross-section to more or less completely polygonal cross-section. The individual wires in the finished article make tangency not along lines merely, but over facets produced by such further crushing. The result is a helically stranded sector-shaped conductor whose over-all dimensions are less relatively to the effective cross-sectional area of conductor, when compared with a conductor produced by the method of my prior application; the resulting conductor has therefore characteristics which make it useful, and under certain conditions preferable to any stranded sector-shaped conductor hitherto known.

Referring to Figs. I, II, and XXIII, the tubular blank as here shown is (as ordinarily it will be) multi-tubular, one tube being contained within another. Within each tube the helices in which the individual wires extend are turned all of them in the same direction and at the same pitch. It is preferable that as between the several tubes the direction of turning of the helices shall be the same, and that the angle of pitch shall be substantially the same.

In forming from the blank of Fig. II the product of Fig. XXIII, I carry the pressure further. I not merely eliminate (as described above) the tubular spaces within the blank, but I compress the component strands beyond the point of tangency along lines. I change the cross-sectional shape of the individual strands, I bring them to modified polygonal cross-section, and in the finished article the adjacent strands lie in tangency over extended surfaces. This will appear on comparing the Figs. II and XXIII, and on considering individual wires $a$, $b$, $c$, $d$, and $e$. These wires initially are each of them round in cross-section. In the finished article these wires have been modified in cross-sectional shape, and they abut one upon another over areas of substantial extent. Each is modified from circular cross-section to a polygonal cross-section, to this extent at least,—that there are between adjacent wires extended areas of contact. As I have already explained, it is the freedom of the wires to adjust themselves within the bundle both longitudinally and transversely that makes possible the elimination of the tubular space present in the original blank. It is this freedom of the wires to adjust themselves, and the fact that adjacent wires are laid in helices which extend in the same direction and at the same degree of turning that makes possible this further crushing without loss in effectiveness of the finished article.

In this specific elaboration of my invention each individual wire is elongated. The cross-sectional area of conductor in the finished article is less than the cross-sectional area of conductor in the blank. The crushing and elongation of the individual wire is, it will be remarked, an elongation which is uniform from point to point throughout the length of the wire. It is this substantial uniformity in elongation from point to point throughout the entire length of each wire that is essential to practical success.

In Figs. XXIV and XXV, I have shown that if the blank be a multi-tubular blank the successive tubes, instead of being spaced at intervals apart may be tangent. In this case the initial blank contains but one hollow space to be crushed out,—that which is found within the inner layer of wires. The crushing of the blank not only eliminates this space; but, as in the case already considered, it effects readjustment of the individual wires and the crushing of the individual wires one upon another, modifying the individual wires in cross-sectional shape, causing them to assume a polygonal cross-sectional shape, with the sides of the polygons coincident, as between adjacent wires. In this crushing operation the individual wires are elongated and the length of lay is increased, and, as between the two layers, the amount of elongation of individual wires is not exactly the same; but in these respects the individual wires of the bundle respond to the crushing strain, and the result is a sector-shaped bundle such as that shown in Fig. XXV, whose component strands of substantially polygonal cross-section are of substantially uniform cross-section throughout the length of the conductor, and whose component strands lie one against another in tangency over extended facets. The cross-sectional area of conductor in the finished article is less than the total cross-sectional area of conductor in the initial blank, but the ratio of cross-sectional area of conductor to total cross-sectional area is in the finished article very much greater than in the blank,—and very much greater than in any prior achievement in this detail of cable-making. Indeed, no article in the prior art includes a bundle so densely compressed, with its individual components of substantially uniform cross-section throughout its length. The last-named characteristic is, as I have said, of controlling importance. Since in the blank the component wires extend in helical course, in the finished sector every wire will extend in a course which is not straight-away, and a course which I characterize as winding.

In Figs. XXVI and XXVII a single tubular blank consisting of six wires is shown to be reduced according to the specific elaboration of my invention here under consideration to sector shape, and here the matter of the readjustment of the individual wires and the minute shaping of them may be more minutely considered, and the essence of my invention in its simplest form may there be studied and understood.

I claim as my invention:

1. The method herein described of producing a sector-shaped cable conductor which consists in helically stranding a plurality of wires to tubular formation and then, while the component wires continue in a condition of freedom to move relatively both in the direction of their length and transversely, compressing the tubular bundle to sector shape at the expense of the tubular space within the bundle.

2. The method herein described of making a conducting element for a multiple-conductor electric cable which consists in assembling a plurality of tubular elements into a bundle, each tubular element being formed of a single layer of helically stranded tangent wires, and, while the component wires continue in a condition of freedom to move relatively both in the direction of their length and transversely, compressing the bundle to sector shape at the expense of the tubular spaces.

3. The method herein described of making a conducting element for a multiple-conductor electric cable which consists in stranding helically into a tubular bundle a plurality of units, each of which units in turn is a tubular assembly of wires helically stranded together, and, while the component wires continue in a condition of freedom to move relatively both in the direction of their length and transversely, compressing the bundle to sector shape at the expense of the tubular spaces.

4. A stranded, sector-shaped conductor for an electric cable whose sector-shaped cross-section is filled with tangent wires, of unmutilated circular cross section, and in which all the component wires extend in winding courses.

In testimony whereof I have hereunto set my hand.

NORMAN C. DAVIS.